US006556841B2

(12) United States Patent
Yu

(10) Patent No.: US 6,556,841 B2
(45) Date of Patent: *Apr. 29, 2003

(54) SPELLING CORRECTION FOR TWO-WAY MOBILE COMMUNICATION DEVICES

(75) Inventor: Francis H. Yu, Redwood Shores, CA (US)

(73) Assignee: Openwave Systems Inc., Redwood City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,428

(22) Filed: May 3, 1999

(65) Prior Publication Data

US 2003/0017844 A1 Jan. 23, 2003

(51) Int. Cl.$^7$ ............... H04M 1/00; H04B 1/38
(52) U.S. Cl. ............ 455/556; 455/414; 707/533
(58) Field of Search ............. 455/66, 412, 414, 455/466, 575, 556; 707/530–537; 341/23, 28

(56) References Cited

U.S. PATENT DOCUMENTS

| | | | |
|---|---|---|---|
| 4,164,025 A | 8/1979 | Dubnowski et al. | |
| 4,566,065 A | 1/1986 | Toth | |
| 4,650,927 A | 3/1987 | James | |

(List continued on next page.)

FOREIGN PATENT DOCUMENTS

| | | |
|---|---|---|
| EP | 0 464 726 A3 | 1/1992 |
| EP | 0 540 147 A2 | 5/1993 |
| EP | 0 651 315 A1 | 5/1995 |
| EP | 0 651 316 A1 | 5/1995 |
| EP | 0 732 646 A2 | 9/1996 |
| WO | WO 89/05745 | 6/1989 |
| WO | WO 90/07149 | 6/1990 |
| WO | WO 97/05541 | 2/1997 |
| WO | WO 98/33111 | 7/1998 |

OTHER PUBLICATIONS

Rau et al, "Dialing for Documents: An Experiment in Information Theory", Seventh Annual Symposium on User Interface Software and Technology (UIST), Nov. 1994.

Oommen et al., "Correction to 'An Adaptive Learning Solution to the Keyboard Optimization Problem'", IEEE Transactions on Systems, Man, and Cybernetics, vol. 22, No. 5, Sep./Oct. 1992.

Hymes et al., "Speed Keyboard for Data Processor", IBM Technical Disclosure Bulletin, vol. 23, No. 2, Jul. 1980.

*Primary Examiner*—William Trost
*Assistant Examiner*—Simon Nguyen
(74) *Attorney, Agent, or Firm*—Beyer Weaver & Thomas, LLP

(57) ABSTRACT

An apparatus and method for implementing spelling error detection and correction for a two-way mobile communication device. The two-way mobile communication device has a display screen and a telephone-type keypad (e.g., keys 0–9, "*", "#", etc.) with the characters mapped onto each key in a many to one fashion. According to one embodiment, when the end of a character string (e.g., a word) is indicated by the input of a termination symbol (e.g., a space or "#") then that character string is compared to a plurality of character strings stored in a dictionary. If no match is found for the character string in the dictionary, then it assumed that the character string is misspelled. Individual character elements of the subject character string are then systematically replaced by character elements mapped to the same key, and then each combination is compared to the entries resident in the dictionary. Matching character strings are retrieved and presented to the user for examination and selection or, if so desired, the most likely matching character string can automatically replace the misspelled character string.

29 Claims, 12 Drawing Sheets

U.S. PATENT DOCUMENTS

| | | | |
|---|---|---|---|
| 4,674,112 A | 6/1987 | Kondraske et al. | |
| 4,677,659 A | 6/1987 | Dargan | |
| 4,737,980 A | 4/1988 | Curtin et al. | |
| 4,754,474 A | 6/1988 | Feinson | |
| 4,891,777 A | 1/1990 | Lapeyre | |
| 4,893,238 A | 1/1990 | Venema | |
| 4,991,094 A * | 2/1991 | Fagan et al. | 707/533 |
| 5,109,352 A | 4/1992 | O'Dell | |
| 5,148,367 A * | 9/1992 | Saito et al. | 707/533 |
| 5,184,315 A | 2/1993 | Lapeyre | |
| 5,289,394 A | 2/1994 | Lapeyre | |
| 5,297,041 A | 3/1994 | Kushler et al. | |
| 5,664,896 A | 9/1997 | Blumberg | |
| 5,786,776 A * | 7/1998 | Kisaichi et al. | 341/28 |
| 5,797,098 A | 8/1998 | Schroeder | |
| 5,809,415 A | 9/1998 | Rossmann | |
| 5,818,437 A * | 10/1998 | Grover et al. | 707/533 |
| 5,828,991 A * | 10/1998 | Skiena et al. | 707/533 |
| 5,956,739 A * | 9/1999 | Golding et al. | 707/533 |
| 6,205,342 B1 * | 3/2001 | Oakes et al. | 455/566 |
| 6,307,548 B1 * | 10/2001 | Flinchem et al. | 341/22 |
| 6,310,971 B1 * | 10/2001 | Shiiyama | 382/181 |
| 6,377,965 B1 * | 4/2002 | Hachamovitch | 707/530 |

* cited by examiner

SPELLING CORRECTION FOR TWO-WAY MOBILE COMMUNICATION DEVICES

BACKGROUND OF THE INVENTION

1. Field of the Invention

The present invention relates to two-way mobile communication devices and, more particularly, to a spelling error detection and correction system for two-way mobile communication devices.

2. Description of the Related Art

There are already several hundred million subscribers of wireless communication services throughout the world. With this proliferation of wireless communications, it is becoming more and more likely that parties will interact with one another in instances where the only means of communication for one or both parties is through wireless communications. The communications between the parties can be social or business related. Wireless communication is achieved when at least one party is making use of a two-way mobile communication device and a wireless network. Two-way mobile communication devices can, for example, include personal digital assistants (PDAs), two-way pagers, mobile (including cellular) phones and palm-sized computing devices.

These two-way mobile communication devices are finding increasing use in applications and functions requiring the input of text strings of significant length. Examples of situations where text strings are input include, but are not limited to, word processing, email, network browsing and narrowband messaging (e.g. Short Message Service (SMS)). Such two-way mobile communication devices typically utilize telephone-type keypads (e.g., keys 0–9, "*", "#" etc.), where the characters are mapped onto each key in a many to one fashion, and have limited processing and memory capabilities relative to the personal computing devices performing similar functions. Additionally, as the size and cost of these two-way mobile communication devices decreases, the size of the display screens increases and the space allotted for the keypads continues to be reduced.

This combination of a keypad with many-to-one character mapping residing in a small confined area contributes to the reduced usability of the devices. This reduction in usability contributes to a dramatic increase in misspelled words. For standard computer keyboards one of the principal causes of misspelled words results from operators inadvertently activating a non-intended key in the general vicinity of the intended key. Typically, the operator knows how to spell the word but hits the wrong key. This particular form of input error occurs at a substantially greater rate when two-way mobile communication devices are used for text entry as compared to using a personal computer to enter the same text.

Generally, character input selection utilizing the keypad of a two-way mobile communication device requires the user to vary the number of activations (e.g., press the key multiple times) or vary the time of activation (e.g., hold the key down longer) to select a character of interest. For example, the "2" key on a standard telephone keypad is typically assigned the letters "ABC" and using one methodology, for example, pressing the "2" key twice when in a text entry mode of operation causes the letter "B" to be selected. Alternatively, pressing the "2" key three times causes the letter "C" to be selected. Quite frequently the user ends up with an unintended letter because the intended key (e.g., "2") is not activated in the proper manner. As an example, the user intended "B" but "C" is actually input because "2" was pressed three times instead of two times. This type of error is particularly common in two-way mobile communication devices utilizing telephone-type keypad (e.g. keys 0–9, "*", "#" etc.) which are of limited size, where the characters are mapped onto each key in a many to one fashion.

A standard spell checking and correcting program for a personal computer word processing program will generally have a dictionary comprised of between 50,000 and 150,000 words for the English language. Because of large size as well as technological and cost considerations it is generally not feasible to have spell checking and correcting programs with similar sized dictionaries in two-way mobile communication devices.

Thus, there exists a need for improved methods and systems for performing spell checking and correcting functions on two-way mobile communication devices.

SUMMARY OF THE INVENTION

The present invention relates to improved systems and methods for implementing spell checking and correcting applications on two-way mobile communication devices. The invention includes various aspects which can be utilized individually or in combination.

One aspect of the invention is that after entry of a character string a delimiter key is depressed, thus signaling the end of the character string. The character string is then compared to pre-stored character strings resident in memory (e.g., within a dictionary) of a subject two-way mobile communication device. Character strings for which no matches are found with respect to the pre-stored character strings are identified as being misspelled. The individual elements (e.g., letters) of any identified misspelled character strings will be sequentially exchanged for character elements assigned to the same many to one input element (e.g. input key). Each of the resulting modified character strings generated in this fashion can be compared to the pre-stored character strings resident in the subject two-way mobile communication device. Those character strings which match the pre-stored entries are presented to the user for evaluation and selection or automatic replacement (e.g., replacement without review) if so desired.

Another aspect of the invention is that the sequential exchange of input character string elements will proceed in accordance with the probability that a particular character element will occur in a particular position within the character string. For example if there are no words with "z" in the second position stored within the resident dictionary then that substitution will not be utilized. By limiting the number of sequences that must be examined, the processing speed is improved which can be particularly important with mobile communication device having limited processing resources.

In one embodiment, these aspects are beneficially applied to provide spell checking and correcting services for email, messaging and/or word processing applications resident on two-way mobile communication devices. The two-way communication devices are typically hand-held devices having limited size display screens. The two-way communication devices can, for example, be mobile telephones, Personal Digital Assistants (PDA) and Palm-Sized Computing Devices.

The invention can be implemented in numerous ways, including as a method, an apparatus or device, a user interface, a computer readable medium, and a system. Several embodiments of the invention are discussed below.

As a method for spell checking and correcting of character strings input to a mobile device through use of keys of the mobile device, one embodiment of the invention includes the operations of: (a) receiving a character input; (b) determining whether the character input is a predetermined delimiter character; (c) adding the character input to a character string when the determining (b) determines that the character input is not the predetermined delimiter character; (d) performing an initial dictionary look-up for the character string when the determining (b) determines that the character input is the delimiter character; (e) performing character substitutions on at least one character in the character string to produce a modified character string when the performing (b) of the initial dictionary look-up does not locate the character string, the character substitutions being limited to other characters mapped to a common key of the keys of the mobile device; and (f) performing a subsequent dictionary look-up for the modified character string following the performing (e) of the character substitutions.

As a method for performing spelling error detection and correction for a two-way mobile communication device having a display screen and a telephone-type keypad, where input characters are mapped onto the keys in a many to one fashion, one embodiment of the invention includes: storing a plurality of acceptable character strings and associated information within an on-board dictionary resident within the two-way mobile communication device; receiving an input character string where an end of the input character string is indicated by a termination character; comparing the received input character string to the acceptable character strings and providing an indication when a character string substantially matching the received input character string is not found within the on-board dictionary; replacing the individual characters of the received input character string for which no substantial matches were found with characters mapped to the same key of the telephone-type keypad to generate a plurality of associated character strings; and comparing the associated character strings to the acceptable character strings to identify those of the associated character strings that substantially match the acceptable character strings within the on-board dictionary.

As a computer readable media including computer program code for spell checking and correcting of character strings input to a mobile device through use of keys of the mobile device, one embodiment of the invention includes:
computer program code for receiving a character input;
computer program code for determining whether the character input is a predetermined delimiter character;
computer program code for adding the character input to a character string when the computer program code for determining determines that the character input is not the predetermined delimiter character;
computer program code for performing an initial dictionary look-up for the character string when the computer program code for determining determines that the character input is the delimiter character; computer program code for performing character substitutions on at least one character in the character string to produce a modified character string when the computer program code for performing of the initial dictionary look-up does not locate the character string, the character substitutions being limited to other characters mapped to a common key of the keys of the mobile device; and computer program code for performing a subsequent dictionary look-up for the modified character string following the computer program code for performing of the character substitutions.

As a wireless two-way interactive communication device, one embodiment of the invention includes: a display screen; a telephone-type keypad, where the characters are mapped onto the keys in a many to one fashion; a storage device for storing a plurality of acceptable character strings and associated information within an on-board dictionary resident within the two-way mobile communication device; a memory for storing program code for a processor; a processor coupled to the storage device and the memory. The processor operates to execute the program code stored in the memory to identify input character strings which do not correspond to at least one of the acceptable character strings in the storage device, to generate replacement character strings for the identified input character strings using replacement characters being mapped to the same key as the character in the identified input character string being replaced, and then to identify those of the replacement character strings that correspond to at least one of the acceptable character strings in the storage device.

The advantages of the invention are numerous. Different embodiments or implementations may yield one or more of the following advantages. One advantage of the invention is that users of two-way mobile communication devices are provided with spell checking and correcting services which specifically addresses one of the most frequently encountered input errors. Another advantage of the invention is that the spell checking and correcting services can be provided on two-way mobile communication devices without the overhead associated with larger spelling applications/ modules resident on larger personal computer (PC) systems (e.g., spell checking for PC word processing programs. Yet another advantage of the invention is that by limiting the number of combinations (e.g., two letters for input keys "2", "3", "4", "5", "6", and "8" and three letters for "7" and "9") the time required to process all the possible combinations is dramatically reduced and thus less burdensome on two-way mobile communication devices.

Other aspects and advantages of the invention will become apparent from the following detailed description taken in conjunction with the accompanying drawings, which illustrate, by way of example, the principles of the invention.

BRIEF DESCRIPTION OF THE DRAWINGS

The present invention will be readily understood by the following detailed description in conjunction with the accompanying drawings, wherein like referenced numerals designate the structural elements, and in which.

DETAILED DESCRIPTION OF THE INVENTION

The invention pertains to systems and methods for implementing spell checking and correcting applications two-way mobile communication devices having display screens and a telephone-type keypad (e.g., keys 0–9, "*", "#" etc.), where the characters are mapped onto each key in a many to one fashion. According to one embodiment of the present invention, when the end of a character string (e.g., a word) is indicated by the input of a termination symbol (e.g., a space or "#") then that character string is compared to a plurality of character strings stored in a dictionary. If no substantial match is found for the character string in the dictionary then it assumed that the character string is misspelled. Individual character elements of the subject character string are then systematically replaced by character elements mapped to the same key and each combination is compared to the entries resident in the dictionary. Matching character strings are retrieved and presented to the user for examination and selection or, if so desired, the most likely matching character string automatically replaces the misspelled character string.

As noted above, it is not feasible to store a full size dictionary within a two-way mobile communication device. One way to limit the requirements (e.g., a 10,000 to 20,000 word dictionary) on any spell checking and correcting application for a two-way mobile communication device is to identify the types of spelling errors occurring and tailor any spell checking and correcting program and its dictionary to address that particular problem.

The two-way mobile communication device, also referred to as two-way interactive communication devices, wireless client devices, and mobile devices, include but are not limited to personal digital assistants, palm-sized computing devices, mobile phones (including cellular phones), two-way pagers and wireless capable remote controllers. Such devices typically have significantly less memory and processing capability than is found in desktop and laptop computers. These mobile devices typically have a small display screen and a telephone-type keypad (e.g., keys 0–9, "*", "#" etc.), where the characters are mapped onto each key in a many to one fashion, as opposed to the full function keyboards and monitors associated with desktop or laptop computers.

Embodiments of the invention are discussed below with reference to FIGS. 1–8B. However those skilled in the art will readily appreciate that the detailed description given herein with respect to these figures is for exemplary purposes as the invention extends beyond the embodiments discussed below.

Figure 1:
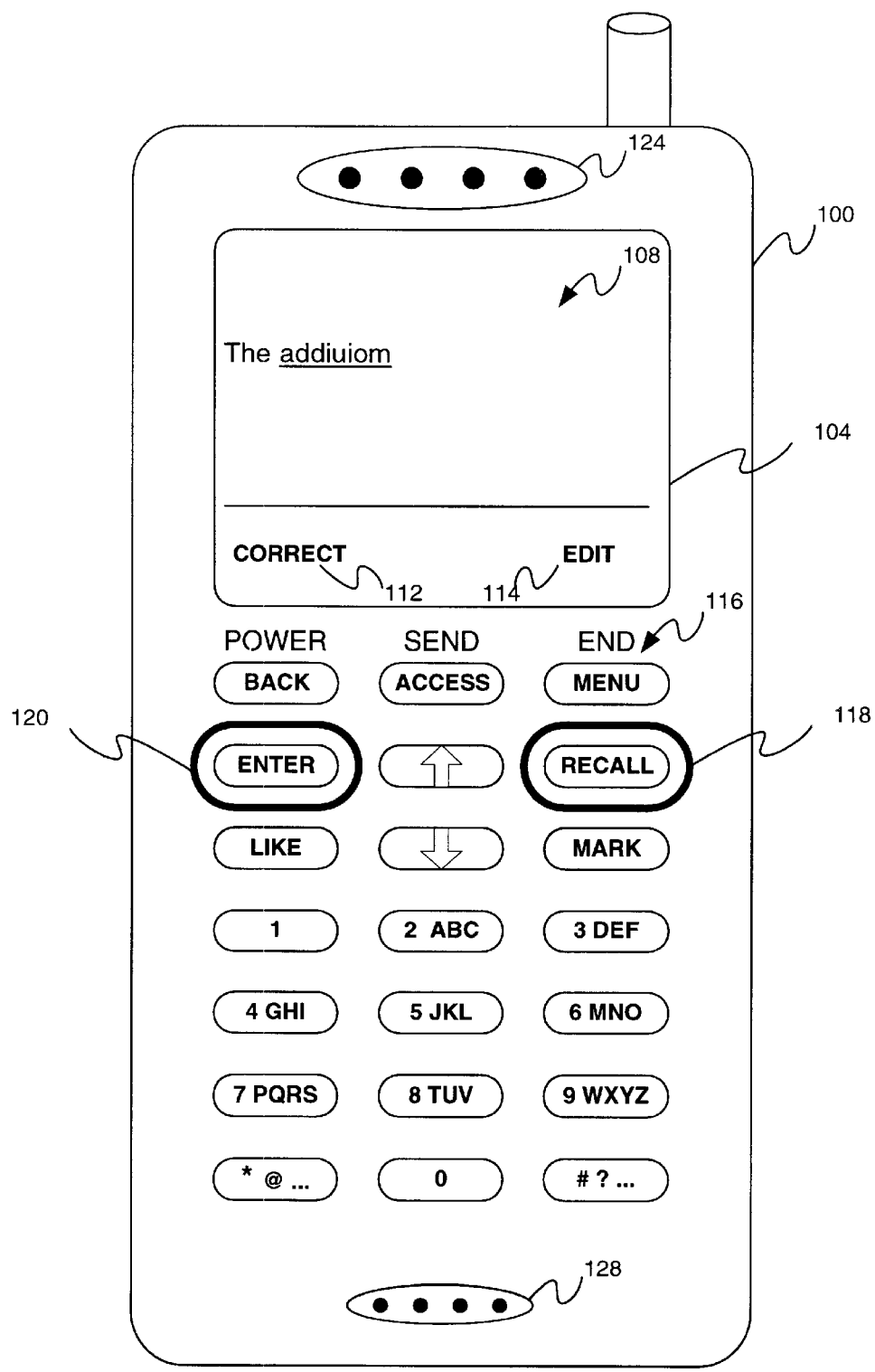
FIG. 1 illustrates a two-way mobile communication device that may be utilized to practice the present invention.

To facilitate a description of the present invention, it is deemed necessary to recite some of the features of a mobile device, which may be used to practice the present invention. With reference now to FIG. 1, mobile device 100 (e.g. a cellular telephone, a two-way pager, a personal digital assistant, or a palm-sized computer) includes a display screen 104, a telephone-type keypad (e.g. keys 0–9, "*", "#" etc.) 116 where the characters are mapped onto each of a plurality of the keys in a many to one fashion, a speaker 124 and microphone 128. Display screen 104 displays information 108 and softkey identifiers 112 and 114 to a user of the mobile device 100. Telephone-type keypad 116 has function keys (e.g., "MENU", "BACK") and navigation keys (↑ and ↓) in addition to the standard keyset. Additionally, function keys ("ENTER" and "RECALL") 118 and 120 are utilized for soft key inputs.

The information 108 displayed on displayed on display screen 104 pertains to a first example and includes two entered character strings (e.g., words)—"The" and "addiuiom", where the underlining indicates that a character string which substantially matches the entered character string was not found in the on-board dictionary resident on mobile device 100. In other words, the underlined character string is unrecognized and may be misspelled. One of ordinary skill in the art will comprehend that various other techniques can be used to identify misspelled words, such as bold, italics, flashing and reverse video.

The individual entered character strings are separated by a space which is input using the key labeled "#? . . . ". In addition to separating the individual character strings, the space provides an indication of the termination of the preceding character string. According to one aspect of the present invention each character string is subjected to a recognition process when a string termination character (e.g., a space) is encountered. Unrecognized character strings (e.g., misspelled words) are identified and a notification or indication is provided to the user as noted above.

Figure 2:
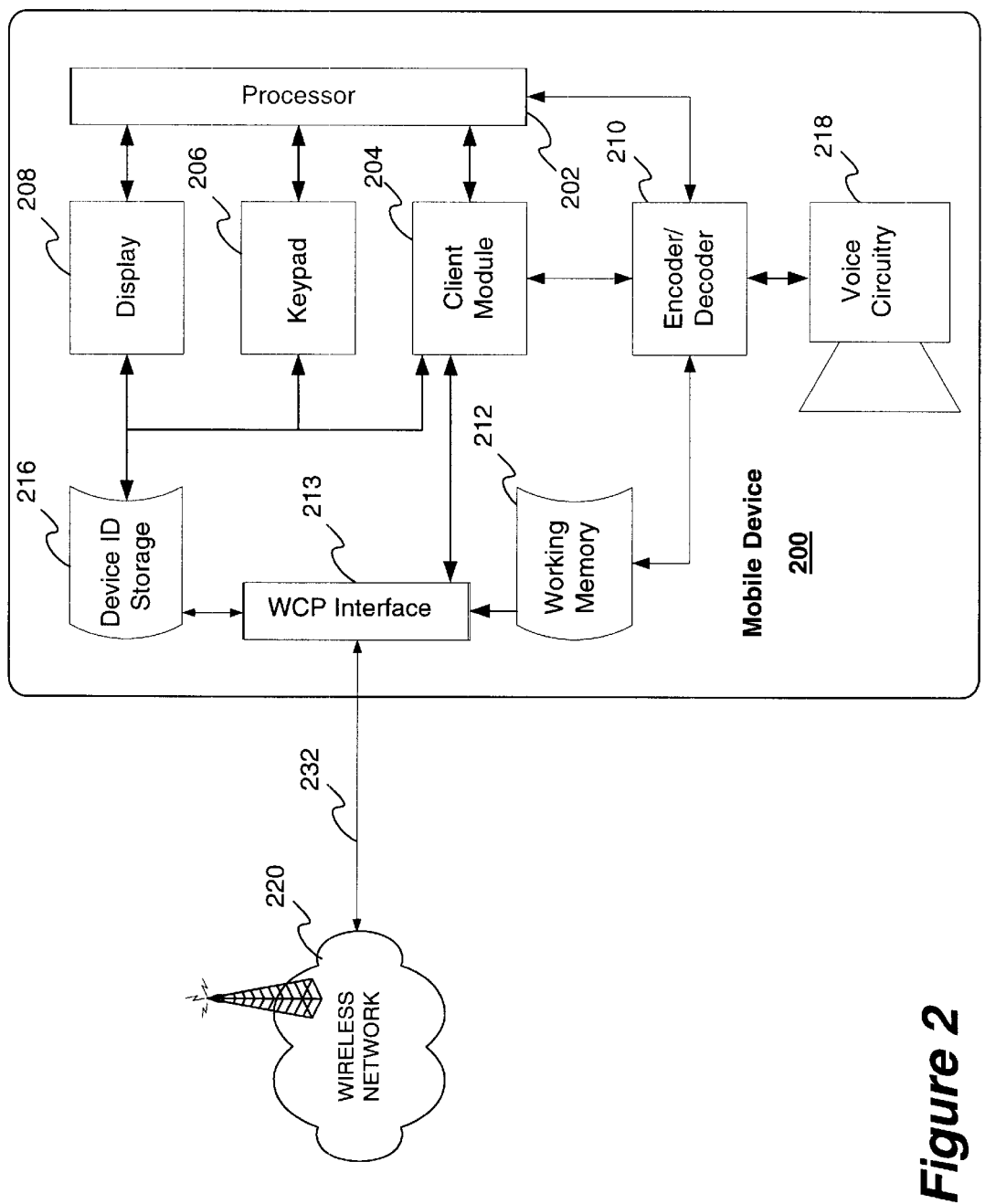
FIG. 2 illustrates a block diagram of principle components of an exemplary two-way mobile communication device.

Referring now to FIG. 2, a more detailed description of mobile device 200, which may be mobile device 100 of FIG. 1, is provided. FIG. 2B is a block diagram of a mobile device 200 according to an embodiment of the invention. Mobile device 200 includes a WCP interface 213 that couples to wireless network 230 via a radio-frequency (RF) transceiver (not shown) to receive incoming and outgoing signals. A device identifier (ID) storage 216 supplies a device ID to the WCP interface 213.

The device ID identifies a specific code that is associated with the wireless client device 200. The device ID can be used by the wireless network 220 or a proxy server device (not shown) to associate mobile device 200 with a user account. The device ID can be a phone number of the device or a combination of an IP address and a port number. The device ID can be further associated with a subscriber ID authorized by a wireless network carrier as part of the procedures to activate a subscriber account for the mobile device 200. The subscriber ID is a unique identification to mobile device 200.

Mobile device 200 also includes voice circuitry 218 (e.g., a speaker and a microphone) and the associated hardware (e.g., an encoder/decoder 210, a processor 202 and keypad circuitry 208) which can provide a telephone mode of operation which is separate and distinct from a data mode of operation used when interfacing with proxy server device. In the telephone mode of operation, a user can cause mobile device 200 to place a phone call to another party having a phone, either wireless or land-based.

In addition, mobile device 200 includes a client module 204 which works in conjunction with the processor 202 and the working memory 212 to perform the processing tasks performed by the mobile device 200 including establishing a communication session with a wireless network, requesting and receiving data via the wireless network, displaying information on a display screen through the use of display circuitry 208, and receiving user input from a user via a keypad controlled by keypad circuit 206. Additionally, client module 204 operates, among other things, a browser, commonly referred to as micro-browser, which requires much less computing power and memory than well-known HTML browsers do. The micro-browser is, preferably, a HDML micro-browser. One such micro-browser is, for example, available from Unwired Planet, Inc. located at 800 Chesapeake Drive, Redwood City, Calif. 94063. Additional details on accessing a (proxy) server device from a mobile device using a (micro) browser are described in U.S. Pat. No. 5,809,415, which is hereby incorporated by reference.

Figure 3:
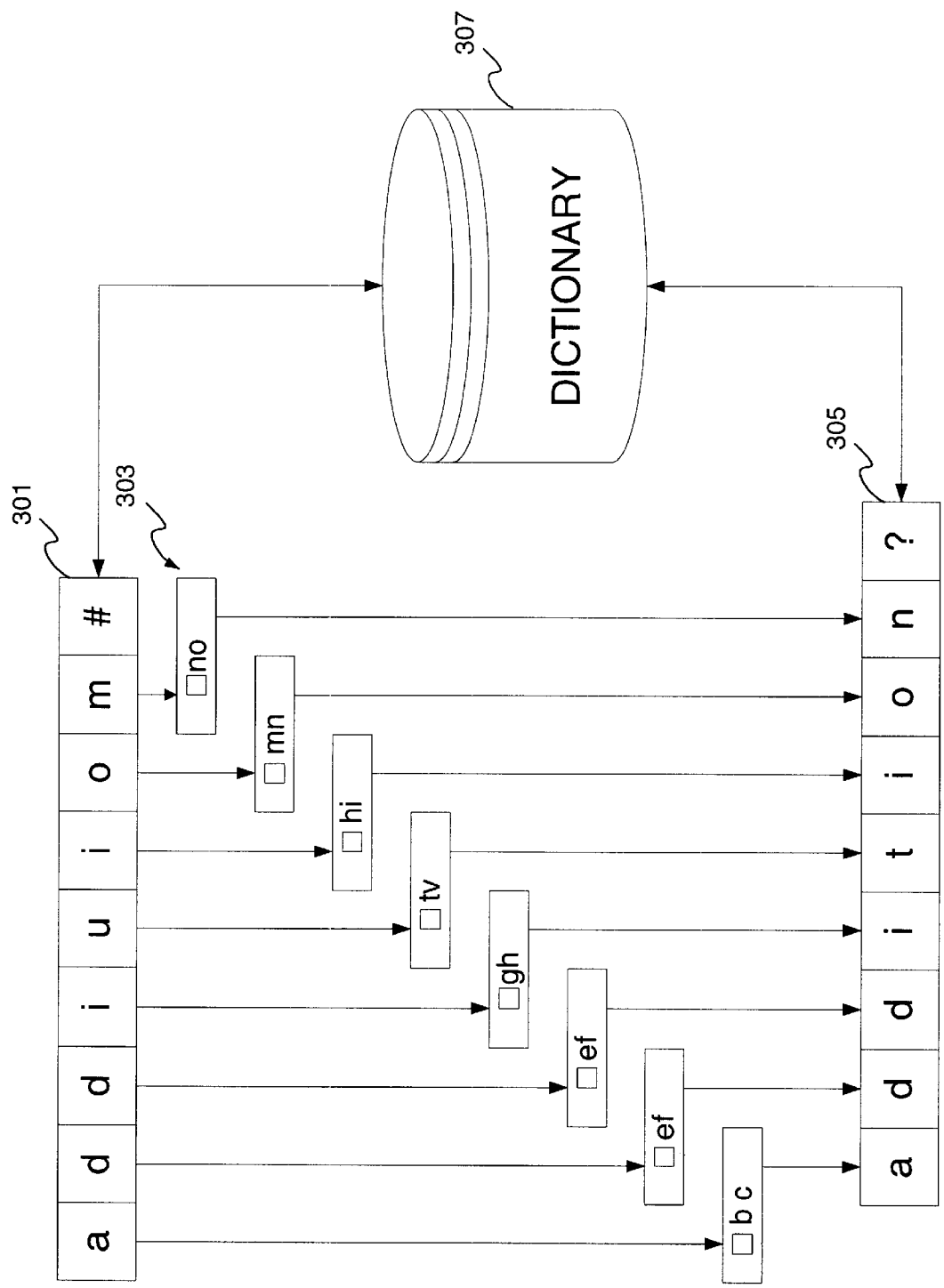
FIG. 3 schematically illustrates character replacement methodology and character string examination according to one embodiment of the invention for a word with multiple errors and a single matching character string.

Referring now to FIG. 3, the processing of the misspelled entered character string "addiuiom" 301 of FIG. 1 according to one embodiment of the invention is described. The character "#" identifies the end of the character string to be processed. Typically, the character string represents a word. A search is then made in dictionary 307 for character strings substantially matching "addiuiom". In the current example, the character string "addiuiom" is not found in the dictionary 307 and an indication is provided to the user (e.g., "addiuiom" 301 is underlined). Letters mapped (303) to the same keys systematically replace the letters in the character string "addiuiom" with letter associated with the same key. For example, the letter "a" can be replaced by the letters "b" and "c" since these letters are mapped to the "2" key. Each of the possible combinations is compared to the entries in dictionary 307. For example, using character substitutions limited to other characters associated with the same key that was entered, the following words would be compared with entries in dictionary 307: bddiuiom, cddiuiom, aediviom, afdiviom, cediuiom, . . . , addition, . . . In this example, the only combination, which substantially matches an entry in dictionary 307, is "addition?" 305 which represents the character string "addition" and any similar strings (e.g., additional, etc.) which may be stored. The order, number and sequence of the character replacements can vary widely. In one embodiment, the ordering or sequencing can be directed by probabilities for achieving a successful result as some character sequences are more likely to produce words than others. Thereafter, the "addition" character string (and related strings) are presented to the user for examination/selection. Alternatively, the processing can provide for automatic replacement (without user selection) if so desired.

Figure 4:
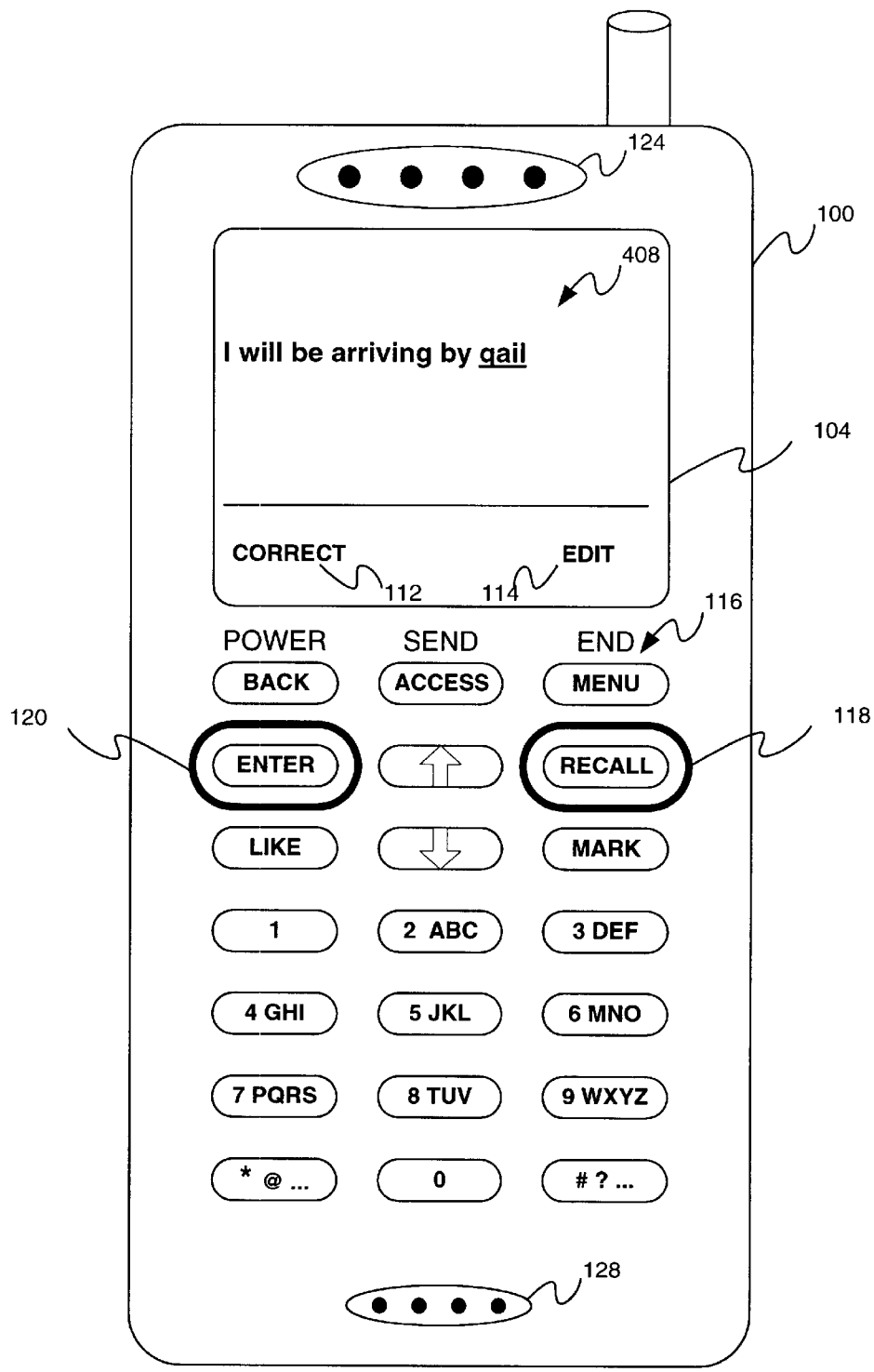
FIG. 4 illustrates a two-way mobile communication device displaying a misspelled character string that may be utilized to practice the present invention.

Referring to FIG. 4, another example is presented where a user input 408 "I will be arriving by qail" is displayed on the mobile device 100. Here, the user input includes six (6) separate character strings. Of these character strings, the character string "gail" is identified (e.g., by underlining) as possibly being misspelled. Activation of softkey 120 causes the spelling correction process to be initialized. Activation of softkey 114 allows a user to manually edit the identified misspelled word.

Figure 5A:
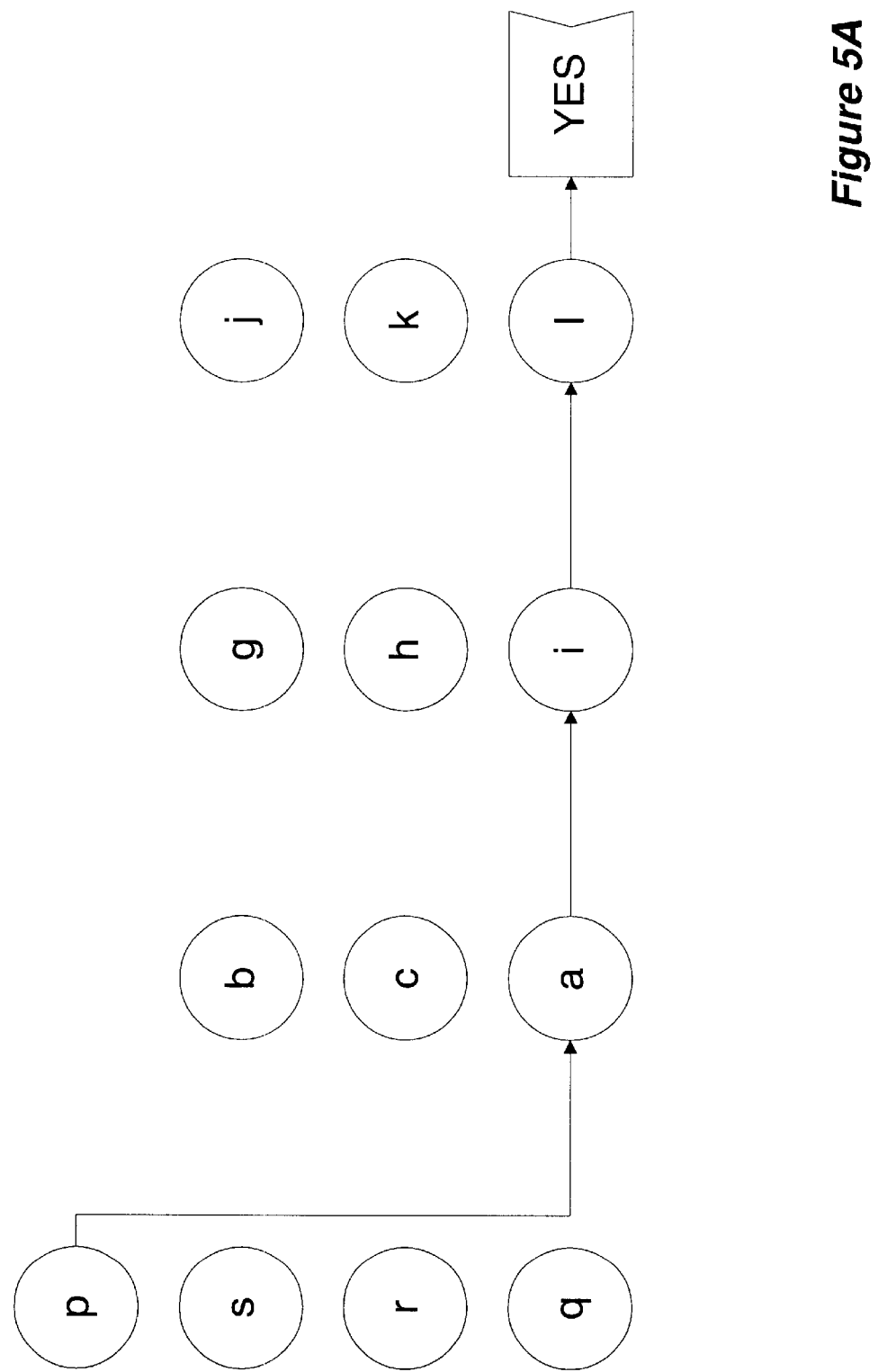
FIGS. 5A–5D schematically illustrate the replacement characters for the misspelled character string displayed in FIG. 4.
Figure 5B:
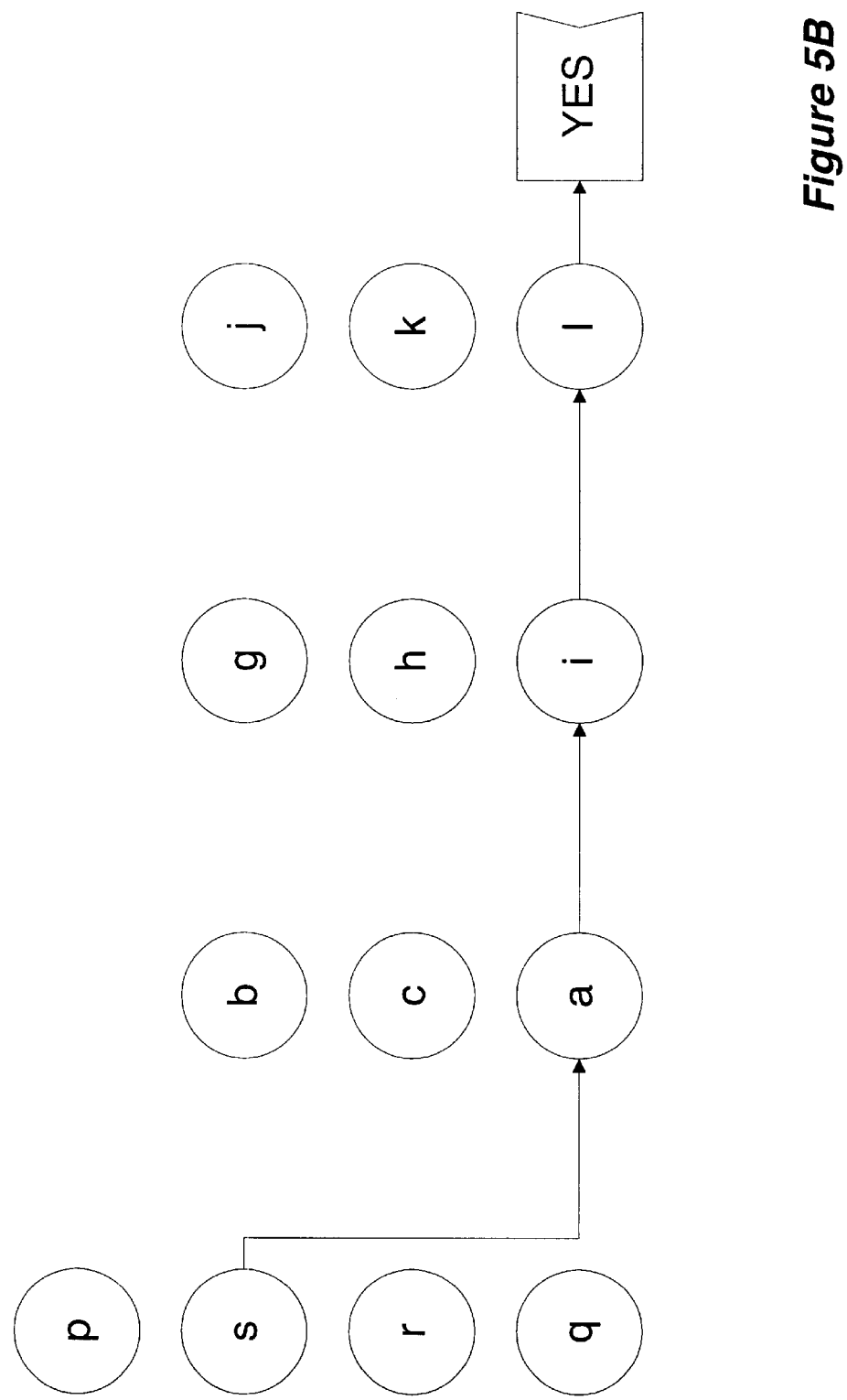
Figure 5C:
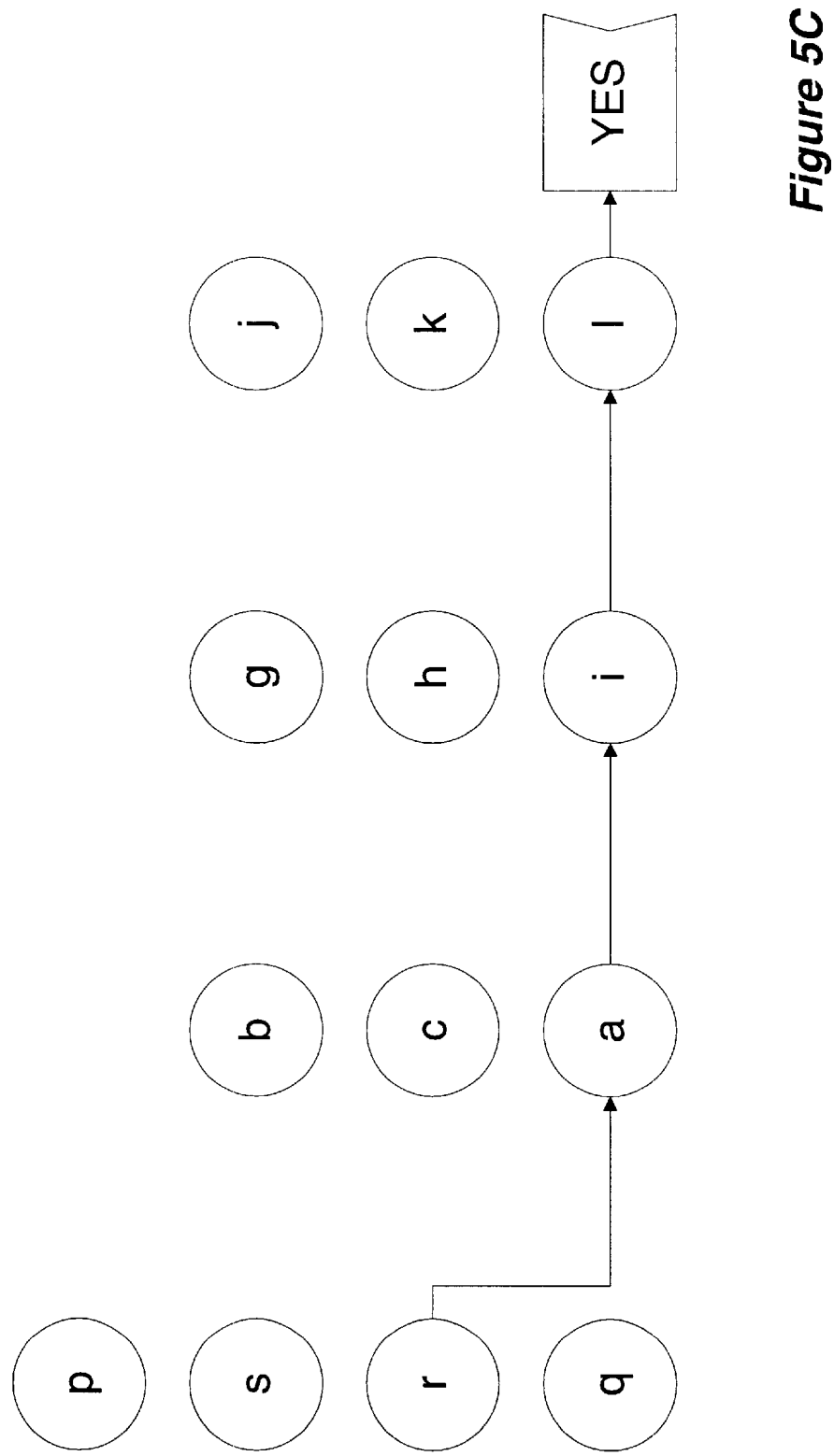
Figure 5D:
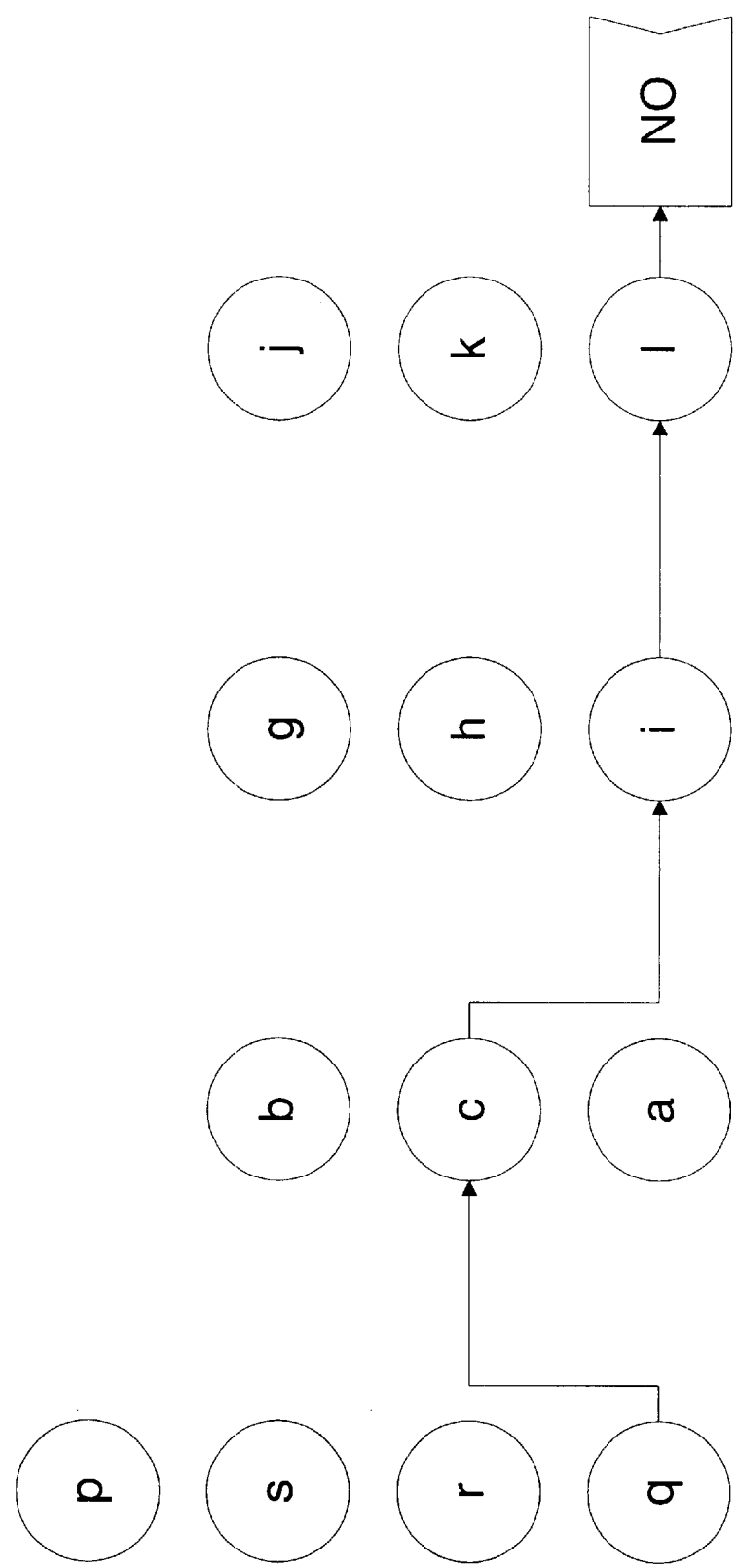

FIGS. 5A–5D illustrate the combinations that are generated and analyzed as part of the spelling correction process for the example (i.e., "qail"). Referring to FIG. 5A, the first character "q" is mapped to the "7" key as are "p", "r" and "s". In the first combination "p" replaces "q" and the character string "pail" is checked with the dictionary (not shown). The character string "pail" has a match in the dictionary so it is flagged "YES". Referring to FIG. 5B, "s" replaces "q" and the character string "sail" is checked with the dictionary. Again, a match is found and the character string is flagged "YES". Referring to FIG. 5C, "r" replaces "q" and the character string "rail" is checked with the dictionary. Once again, a match is found and the character string "rail" is flagged "YES". Referring now to FIG. 5D, the second character "a" is processed. Initially, the second character "a" is replaced by "c" and the character string "qcil" is checked with the dictionary. No match is found so it is flagged "NO".

It should be understood that with each substitution one or more character substitution can be made to the character string such that all the available substitutions and combinations thereof can be made. The number of such substitutions and combinations to be considered is generally limited by using only those characters associated with the character that was input. Such associations are determined by the key that was activated to enter the input character.

Efficiency in this processing can be improved (i.e., abbreviated processing) if certain substitutions are eliminated when they are not likely or possible to occur. These unlikely conditions can be considered processing rules. In the case of English, many letter combinations do not yield words and thus can be bypassed to increase efficiency. For example, English combinations beginning with "q" can be eliminated immediately from consideration if the next symbol is not "t", "u" or "v". As another example, many letters are unlikely to occur at certain character positions in a word (such as "z" as the second letter of a word) and thus can be bypassed. Hence, the processing rule is able to significantly limit the character substitutions to be performed.

Processing rules can also be determined based on the probability of occurrence whereby processing can be performed more efficiently. Such processing rules can control the order by which the character substitutions proceed, namely, more probable substitutions first. The use of probability based processing rules potentially allows for early termination if sufficient matches are found.

Figure 6:
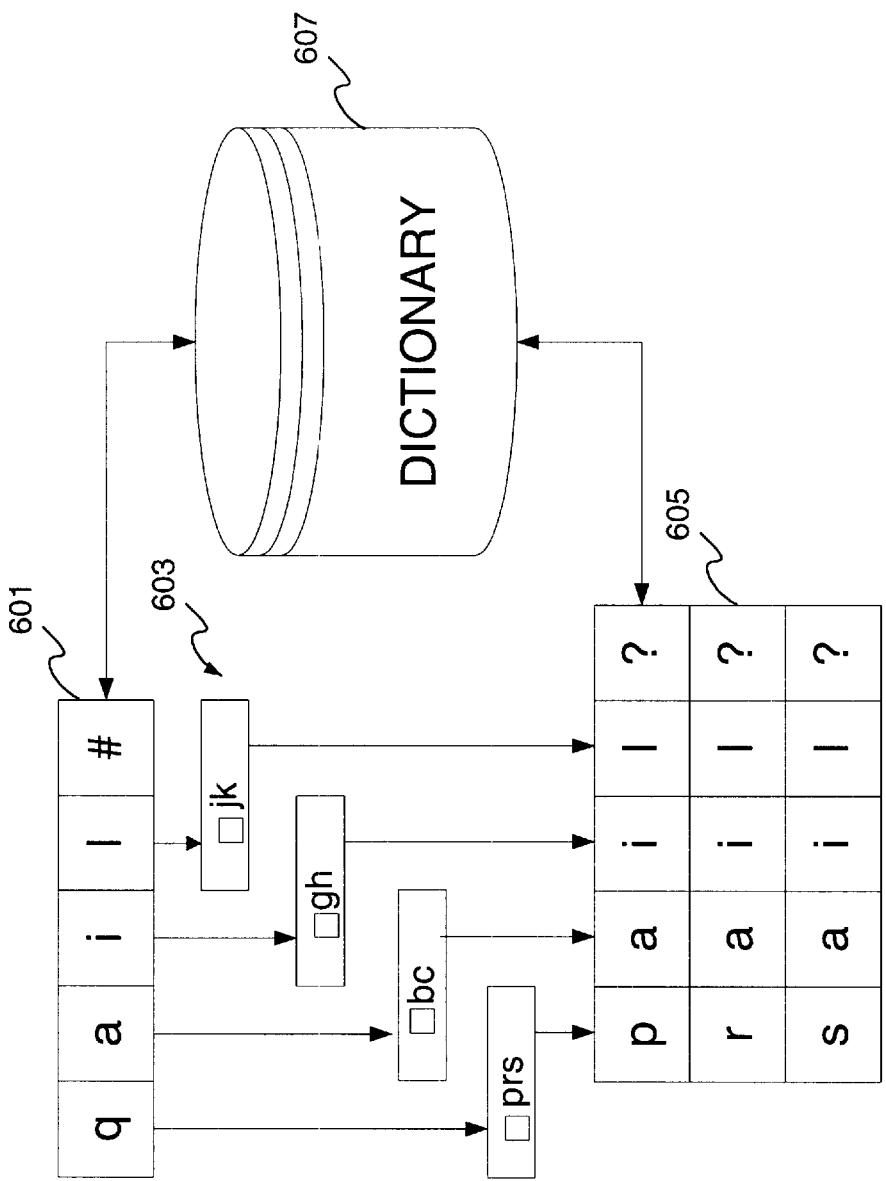
FIG. 6 schematically illustrates the character replacement methodology and character string examination for the misspelled character string displayed in FIG. 4.

FIG. 6 provides an overview of processing associated with the spelling correction process for the misspelled character string "qail" 601 according to one embodiment of the invention. As before, the character "#" identifies the end of the character string to be processed. A search is then made in dictionary 607 for character strings substantially matching "qail." In the current example, the character string "qail" is not found and an indication is provided to the user (e.g., "qail" is underlined). Letters mapped 603 to the same key systematically replace the individual letters in the character string "qail". Each of the possible combinations 603 is compared to the entries in dictionary 607. In this example, there are three combinations which substantially match an entries in dictionary 607. The matching combinations 605 are "pail?", "rail?" and "sail?" where the "?" indicates that variations due to suffixes (e.g., "ing") may be stored in dictionary 607. Once again, the matching character strings (and related strings) are presented to the user for examination/selection or for automatic replacement based on probability of occurrence if so desired.

Figure 7:
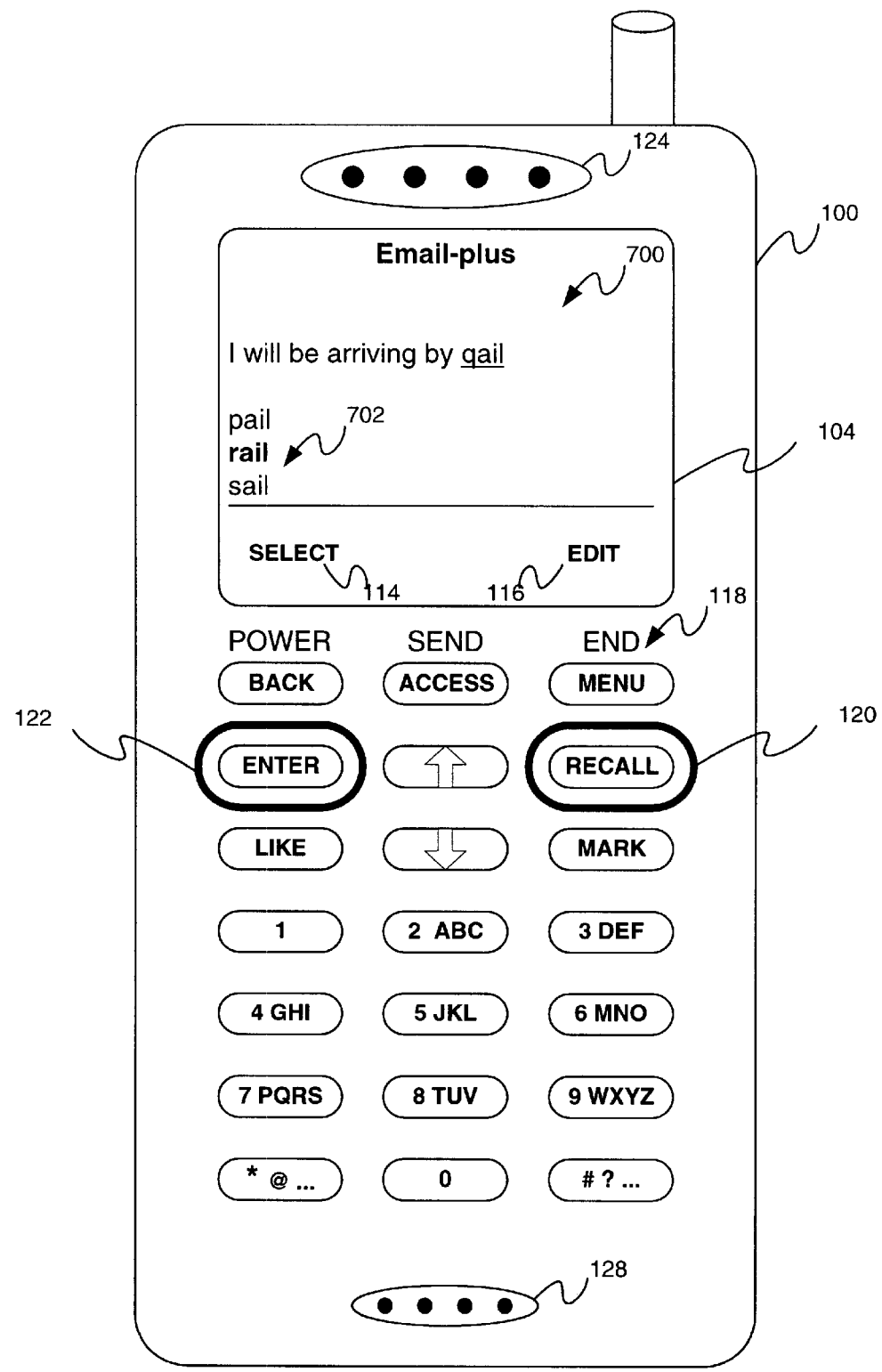
FIG. 7 illustrates a two-way mobile communication device displaying the misspelled character string of FIG. 4 and possible replacements.

FIG. 7 provides an illustration of one of the ways the results of the spelling correction process can be presented to a user of the mobile device 100. Text 700 displayed on screen display 104 includes the character string "qail" which has been identified (by underlining) as being misspelled. Three possible replacements "pail", "rail", and "qail" have been identified as possible replacement and are also displayed as a list 702 on the display screen 104. This list 702 is navigated using navigation keys ↑ and ↓ with the selected character string being distinguishably displayed (e.g., bolded). In particular, the character string "rail" is the selected character string. Pressing softkey selector 122 will cause "rail" to replace "qail". Alternatively, character string replacement can be performed automatically with the most likely word automatically replacing the misspelled word.

Figure 8A:
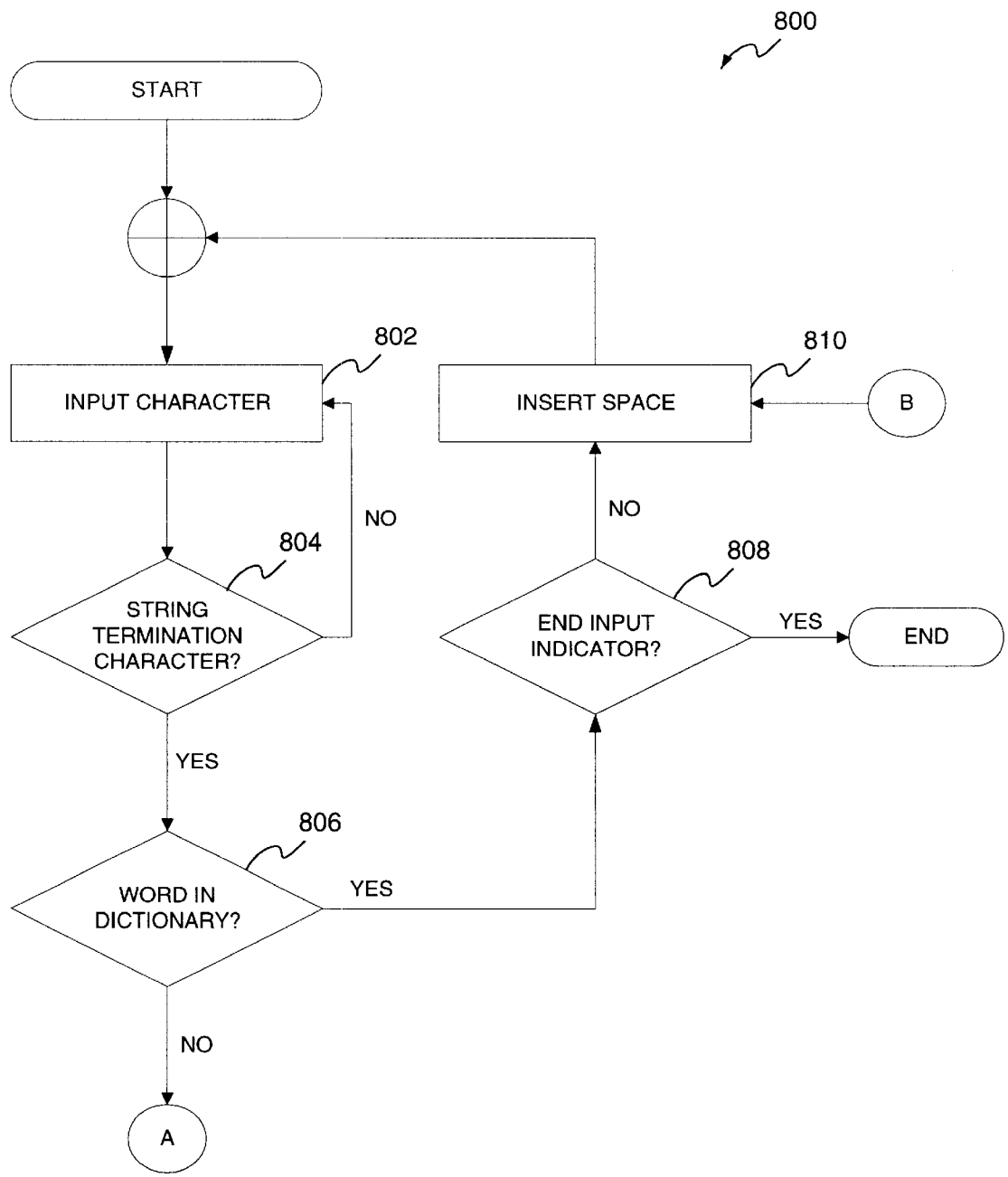
FIGS. 8A–8B are flow charts illustrating the spell checking and correcting process utilized according to one embodiment of the invention.
Figure 8B:
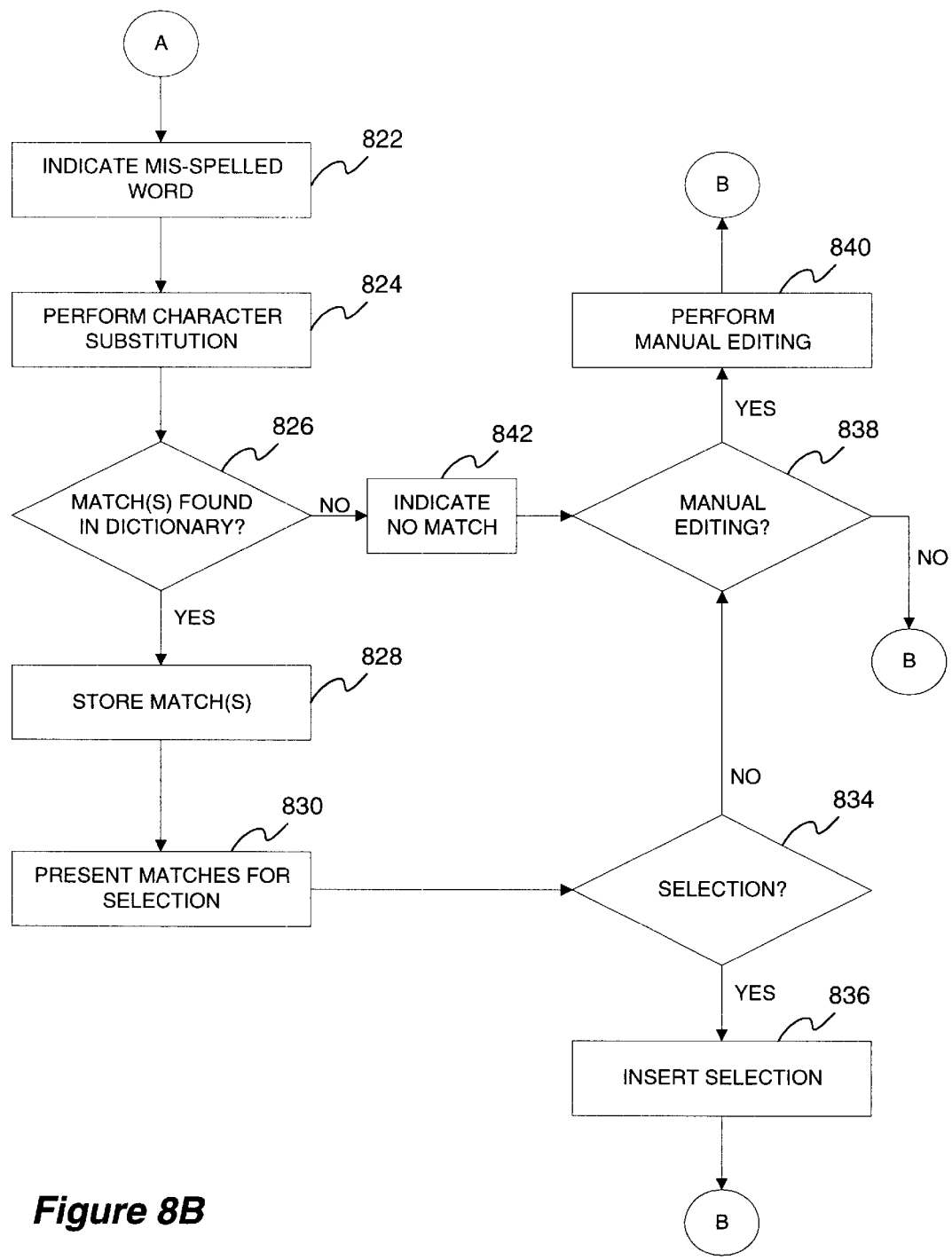

FIGS. 8A–8B illustrate process flow charts which describe the spelling error detection and correction process according to one embodiment of the invention. The spelling error detection and correction process is performed by a mobile device (e.g., mobile device 100 of FIG. 1) to identify misspelled character strings and generate possible replacement character strings. FIGS. 8A–8B illustrate a spelling error detection and correction process 800. At 802 a user inputs a character string (character-by-character) until a string termination character (e.g., a space, "#", etc.) is entered at 804. After termination of the entered string by entry of the string termination character, the character string is compared with the entries in a resident dictionary at 806. If a substantial match is found in the dictionary, then the process ends when there is no more message (e.g., words) to be input at 808. The end of the message can be indicated by the user entering an end input indicator. On the other hand, when a substantial match is found in the dictionary and there is more message to follow, then a space is inserted at 810 and the user may begin inputting another character string. The space inserted serves to separate the words of the message by a space.

If a substantial match is not found in the dictionary for the subject character string, then the process 800 continues with the selection of possible replacement character strings for the misspelled character string. At 822 the user is provided with an indication that a possible misspelled character string has been detected. At 824 the individual characters of the subject misspelled character string are systematically replaced with characters mapped to the same key. The various possible mappings are predetermined and known by the mobile device 100. Each of the possible combinations (modified character strings) provided by mapping with respect to the same keys is compared with the entries in a resident dictionary to determine if any matches are found at 826. If no matches are found, then an indication of no match is provided at 842 and the user is provided with an opportunity to manually edit the character string in question at 838 if desired. If the user decides to perform manual editing at 838, then that mode of operation is entered at 840 and the process proceeds to block 810 in FIG. 8A. If the user declines manual editing at 838, then the process 800 proceeds directly to block 810.

On the other hand, if substantial matches to entries in the resident dictionary are identified at 826 the matches are stored for further processing at 828. Matching entries are thereafter presented to the user for evaluation and selection at 830. If the user selects one of the matching entries at 834, then the selection is inserted in place of the misspelled character string at 836 and the process proceeds to block 810. Otherwise, when one of the matching entries is not selected at 834, the user is provided the option of performing manual editing at 838 as previously described.

The advantages of the invention are numerous. Different embodiments or implementations may yield one or more of the following advantages. One advantage of the invention is that users of two-way mobile communication devices are provided with spell checking and correcting services which specifically addresses one of the most frequently encountered input errors. Another advantage of the invention is that the spell checking and correcting services can be provided on two-way mobile communication devices without the overhead associated with larger spelling applications/ modules resident on larger personal computer (PC) systems (e.g., spell checking for PC word processing programs. Yet another advantage of the invention is that by limiting the number of combinations (e.g., two letters for input keys "2", "3", "4", "5", "6", and "8" and three letters for "7" and "9") the time required to process all the possible combinations is dramatically reduced and thus less burdensome on two-way mobile communication devices.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for spell checking and correcting of character strings input to a mobile device through use of keys of the mobile device, said method comprising the operations of:
   (a) receiving a character input, the character input uniquely identifying a character;
   (b) determining whether the character input is a predetermined delimiter character;
   (c) adding the character input to a character string when said determining (b) determines that the character input is not the predetermined delimiter character;
   (d) performing an initial dictionary look-up for the character string only after said determining (b) determines that the character input is the delimiter character;
   (e) performing character substitutions on at least one character in the character string to produce a modified character string when said performing (d) of the initial dictionary look-up does not locate the character string, the character substitutions being limited to other characters mapped to a common key of the keys of the mobile device; and
   (f) performing a subsequent dictionary look-up for the modified character string following said performing (e) of the character substitutions.

2. A method as recited in claim 1, wherein the mobile device includes a display screen, and
   wherein said method further comprises the operation of:
   (g) displaying the modified character string on the display screen when said performing (d) of the subsequent dictionary look-up does locate the modified character string.

3. A method as recited in claim 2,
   wherein said performing (e) of the character substitutions produces a plurality of modified character strings, and
   wherein said performing (f) of the subsequent dictionary look-up operates to look-up each of the plurality of modified character strings.

4. A method as recited in claim 3, wherein said performing (e) operates to provide one or more character substitutions on each character in the character string to produce the plurality of modified character strings.

5. A method as recited in claim 3, wherein said displaying (g) operates to display those of the plurality of modified character strings that are located by the subsequent dictionary look-up.

6. A method as recited in claim 5, wherein said method further comprises the operations of:
   (h) receiving a selection of one of the modified character strings being displayed on the display screen; and
   (i) replacing the selected one of the modified character strings with the character string.

7. A method as recited in claim 1, wherein the character substitutions are further limited by processing rules.

8. A method as recited in claim 7, wherein the processing rules operate to further limit the character substitutions based on probabilities.

9. A method as recited in claim 1, wherein the ordering of the character substitutions is determined based on probabilities.

10. A method for performing spelling error detection and correction for a two-way mobile communication device having a display screen and a telephone-type keypad, where input characters are mapped onto the keys in a many to one fashion, said method comprising:
   storing a plurality of acceptable character strings and associated information within an on-board dictionary resident within the two-way mobile communication device;
   receiving an input character string where an end of the input character string is indicated by a termination character;
   comparing the received input character string to the acceptable character strings and providing an indication when a character string substantially matching the received input character string is not found within the on-board dictionary;
   thereafter replacing the individual characters of the received input character string for which no substantial matches were found with characters mapped to the same key of the telephone-type keypad to generate a plurality of associated character strings; and
   comparing the associated character strings to the acceptable character strings to identify those of the associated character strings that substantially match the acceptable character strings within the on-board dictionary.

11. A method as described in claim 10, further comprising:
   displaying the identified associated character strings that substantially match the acceptable character strings on the display screen of the two-way mobile communication device;
   receiving a selection input relating to one of the identified associated character strings; and
   replacing the input character string for which no substantial matches were found with the selected one of the identified associated character strings.

12. A method as recited in claim 10, wherein said associated information is comprised of word usage percentages and spelling rules.

13. A method as recited in claim 12, wherein said word usage percentages and spelling rules are utilized to minimize the number of associated character strings.

14. A method as recited in claim 10, wherein said method further comprises:
   replacing the character string for which no substantial matches were found with the associated character string having a highest usage percentage.

15. A method as recited in claim 10, wherein said comparing the associated character strings to the acceptable character strings is limited by reducing the characters mapped to the same key that are available for replacement.

16. A method as recited in claim 10, wherein said replacing of the individual characters of the input character string for which no substantial matches were found with the characters mapped to the same key of the telephone-type keypad to generate the associated character strings only utilizes those of the characters mapped to the same key that meet a pre-determined statistical threshold.

17. A method as recited in claim 10, wherein the termination character is generated by a predetermined key resident on the telephone-type keypad.

18. A computer readable media including computer program code for spell checking and correcting of character strings input to a mobile device through use of keys of the mobile device, said computer readable media comprising:
   computer program code for receiving a character input, the character input uniquely identifies a character;
   computer program code for determining whether the character input is a predetermined delimiter character;
   computer program code for adding the character input to a character string only after said computer program code for determining determines that the character input is not the predetermined delimiter character;
   computer program code for performing an initial dictionary look-up for the character string when said computer program code for determining determines that the character input is the delimiter character;
   computer program code for performing character substitutions on at least one character in the character string to produce a modified character string when said computer program code for performing of the initial dictionary look-up does not locate the character string, the character substitutions being limited to other characters mapped to a common key of the keys of the mobile device; and
   computer program code for performing a subsequent dictionary look-up for the modified character string following said computer program code for performing of the character substitutions.

19. A computer readable media as recited in claim 18, wherein the mobile device includes a display screen, and
   wherein said computer readable media further comprises:
      computer program code for displaying the modified character string on the display screen when said computer program code for performing of the subsequent dictionary look-up does locate the modified character string.

20. A computer readable media as recited in claim 19,
   wherein said computer program code for performing of the character substitutions produces a plurality of modified character strings, and
   wherein said computer program code for performing of the subsequent dictionary look-up operates to look-up each of the plurality of modified character strings.

21. A computer readable media as recited in claim 20, wherein said computer program code for performing operates to provide one or more character substitutions on each character in the character string to produce the plurality of modified character strings.

22. A computer readable media as recited in claim 20, wherein said computer program code for displaying operates to display those of the plurality of modified character strings that are located by the subsequent dictionary look-up.

23. A computer readable media as recited in claim 22, wherein said computer readable media further comprises:
   computer program code for receiving a selection of one of the modified character strings being displayed on the display screen; and
   computer program code for replacing the selected one of the modified character strings with the character string.

24. A computer readable media as recited in claim 18, wherein the character substitutions are further limited by processing rules.

25. A computer readable media as recited in claim 24, wherein the processing rules operate to further limit the character substitutions based on probabilities.

26. A computer readable media as recited in claim 18, wherein the ordering of the character substitutions is determined based on probabilities.

27. A wireless two-way interactive communication device, comprising:
- a display screen;
- a telephone-type keypad, where the characters are mapped onto the keys in a many to one fashion;
- a storage device for storing a plurality of acceptable character strings and associated information within an on-board dictionary resident within said two-way mobile communication device;
- a memory for storing program code for a processor;
- a processor coupled to said storage device and said memory, said processor operates to execute said program code stored in said memory to identify input character strings which do not correspond to at least one of the acceptable character strings in said storage device, to generate replacement character strings for said identified input character strings using replacement characters being mapped to the same key as the character in said identified input character string being replaced, and then to identify those of the replacement character strings that correspond to at least one of the acceptable character strings in said storage device, and wherein the identified character strings being input include only uniquely identified characters.

28. A wireless two-way interactive communication device as recited in claim 27, wherein said wireless two-way interactive communication device is a hand-held device, and wherein said display screen has a limited size.

29. A wireless two-way interactive communication device as recited in claim 27, wherein said wireless two-way interactive communication device is selected from a group consisting of mobile telephones, Personal Digital Assistants (PDA) and Palm-Sized Computing Devices.

* * * * *